United States Patent [19]

Johansson et al.

[11] Patent Number: 5,069,135
[45] Date of Patent: Dec. 3, 1991

[54] IGNITION SYSTEM

[75] Inventors: Sven-Eric Johansson; Ulf Melhus, both of Karlskoga; Lennart Selin, Kristinehamn, all of Sweden

[73] Assignee: Aktiebolaget Bofors, Karlskoga, Sweden

[21] Appl. No.: 447,472

[22] Filed: Dec. 7, 1989

[30] Foreign Application Priority Data

Dec. 8, 1988 [SE] Sweden ............... 8804426

[51] Int. Cl.⁵ .............. F42B 10/66; F42B 15/10; C06C 5/00
[52] U.S. Cl. .............. 102/380; 102/275.5; 102/275.6; 102/275.7; 244/3.22
[58] Field of Search .............. 102/322, 380, 275.4, 102/275.5, 275.6, 275.7, 275.8, 275.11, 275.12, 287; 244/3.22

[56] References Cited

U.S. PATENT DOCUMENTS

| | | | |
|---|---|---|---|
| 2,452,892 | 11/1948 | Appleton et al. | 102/380 |
| 3,021,785 | 2/1962 | Hradel et al. | 102/275.5 |
| 3,071,073 | 1/1963 | Ammann | 102/380 |
| 3,320,882 | 5/1967 | Schulz | 102/380 |
| 3,713,384 | 1/1973 | Turnbull | 102/275.5 |
| 3,757,692 | 9/1973 | Maue et al. | 102/380 |
| 3,811,380 | 5/1974 | Glass | 102/380 |
| 4,220,087 | 9/1980 | Posson | 102/275.6 |
| 4,282,812 | 8/1981 | Forgey et al. | 102/322 |
| 4,716,832 | 1/1988 | Summer | 102/275.6 |
| 4,821,645 | 4/1989 | Reiss | 102/275.7 |

FOREIGN PATENT DOCUMENTS 0208160 1/1987 European Pat. Off. .
337766 8/1971 Sweden .

Primary Examiner—David H. Brown
Attorney, Agent, or Firm—Pollock, Vande Sande & Priddy

[57] ABSTRACT

The present invention relates to a method and an apparatus for producing rapid cross-ignition of preferably elongate powder or pyrotechnic charges, such as the propellant charges in impulse motors for correcting the trajectory of shells, rockets and missiles. The cross-ignition is produced by initiation of an elongate, extremely fast-burning or detonating primer charge with an extremely low explosive force which has been arranged in contact with at least part of the periphery of the propellant charge. The primer charge forms a tube whose cross-ignition effect is advantageously complemented by an inner, slower burning powder core which is combusted with deflagration.

10 Claims, 1 Drawing Sheet

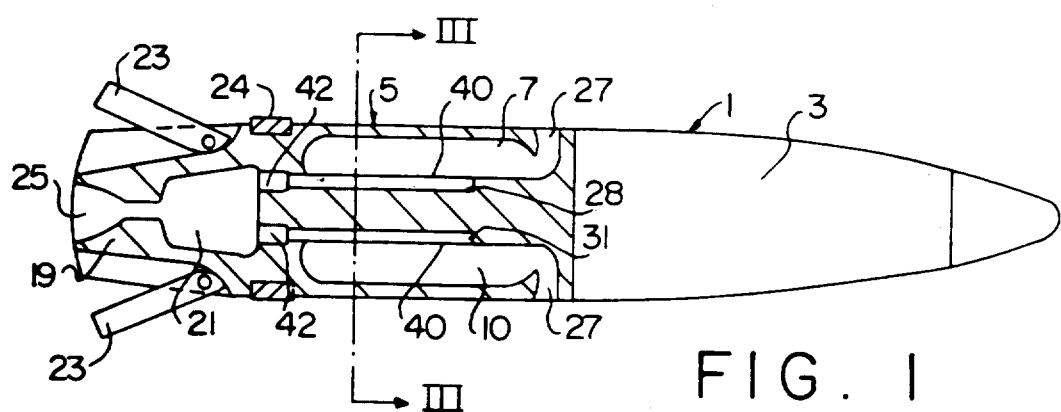
FIG. 1
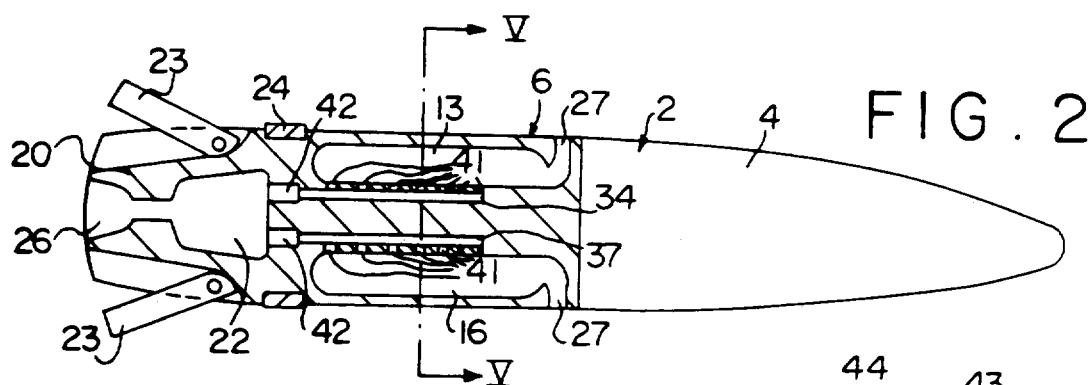
FIG. 2
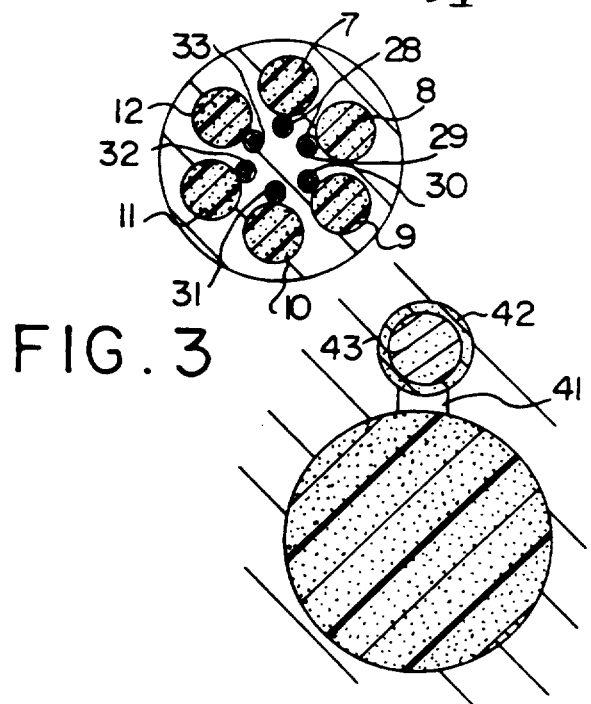
FIG. 3
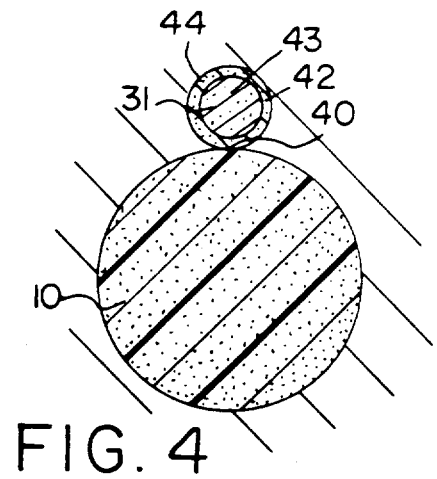
FIG. 4
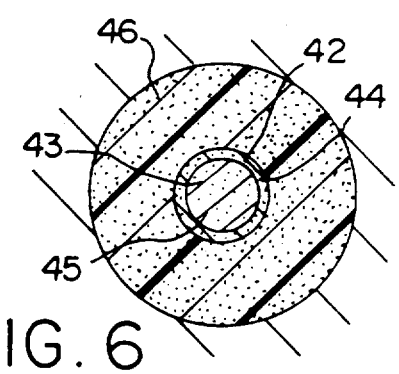
FIG. 5
FIG. 6

IGNITION SYSTEM

FIELD OF THE INVENTION

The present invention relates to a method and an arrangement for rapid initiation and cross-ignition of preferably elongate powder or pyrotechnic charges. The rapid cross-ignition which the ignition system according to the invention makes it very suitable for use as an ignition system for rapid cross-ignition of the propellent charge in gas generators, particularly impulse motors. The ignition system is especially suitable for those impulse motors which have a long length in relation to their cross-section, that is their length is over twice the cross-section, and which have a short or extremely short estimated burning time, which can be calculated in milliseconds. The ignition system according to the invention is primarily designed for use in those impulse motors which are used for correcting the trajectory of preferably final-phase-guided artillery shells in which, for reasons of space, the propellent charges must be made elongate, and at the same time the desired guide impulses require short burning times.

The invention may therefore be more exactly defined as a method and an apparatus for initiating almost instantaneously a cross-ignition of the propellent charge of an impulse motor along the whole or greater part of its length.

BACKGROUND OF THE INVENTION

It appears that developments in barrel artillery are moving towards an ever greater use of final-phase-guided or trajectory-corrected shell types. The costs for such shells are of course substantially higher than for completely unguided shells. However, at the same time, the number of shells required for a certain effect on the target is reduced radically and, in the extreme case, to one single shell which, by means of one or more trajectory corrections during its travel towards the target, can be guaranteed to provide a direct hit on the latter.

Longer ranges of fire and higher trajectory levels for barrel artillery and, thus, an associated increase in the effect exerted on the projectiles by winds which are difficult to assess from the ground and also, to some extent, at least as regards anti-aircraft defense, faster-moving types of targets such as planes and missiles manoeuvring at supersonic speed, have also greatly increased the need to be able to correct the projectile trajectories while the shells are travelling towards the target has increased at great pace. At the same time, miniaturization of the electrotechnics and developments in the target tracking and computing components in the area of fire-control equipment made it possible to reduce the sizes when constructing projectiles whose projectile trajectories can be corrected.

The trajectory correction of both barrel projectiles and also rockets and missiles is in itself previously known. However, there are a number of different methods and apparatuses for producing these trajectory corrections. One method is to use so-called impulse motors, for example gas generators provided with outlet nozzles at suitable positions and with short or very short burning times which give the projectile, rocket or missile a trajectory correction in the form of a laterally directed push. If the outlet of the impulse motor lies in the center of gravity of the projectile, rocket or missile, the trajectory correction is obtained in the form of a lateral component of velocity, for example a velocity vector change. Barrel projectiles whose trajectory can be corrected must be stabilized with fins and provided with a slight rotation in the trajectory so that the desired direction of correction can be chosen at any given time. This in turn means that only very short burning times can be permitted for the trajectory-correcting impulse motors, since the latter may only operate while they are in correct alignment. This means that each impulse motor of this type can only be allowed to have a burning time of the order of magnitude of no more than a few milliseconds, which at the same time limits the maximum trajectory correction which can be obtained with each impulse motor, which itself means that several impulse motors may be needed to produce a single trajectory correction and, in addition, with today's technology, it is possible to effect several separate trajectory corrections while the projectile is moving towards the target. Rotating projectiles afford the advantage that a number of impulse motors can be arranged around the periphery of the projectile in such a way that all have their gas outlet in the center of gravity of the projectile.

As already mentioned, the burning time for each impulse motor in rotating projectiles must be kept extremely low, and then normally less than one millisecond. This means that the motors must be charged with a fast-burning powder, which in itself is not any problem. On the other hand, it has proven substantially more difficult to produce an instantaneous cross-ignition over a sufficiently large part of the burning area of the propellent powder charge available in the initial stage. If the ignition is effected along too small a surface, then, in the case of the extremely fast-burning powder in question here, the effect is that the rapidly increasing gas pressure expels large quantities of uncombusted powder through the outlet nozzle. Thus, the desired trajectory-correcting effect is of course not achieved. The problem of achieving rapid cross-ignition then further increases in the case of smaller projectile sizes, since, with smaller sizes, for example 40-mm AA shells, reasons of space force one to use narrow, elongate charges for the impulse motors.

SUMMARY OF THE INVENTION

For initiation and cross-ignition of the propellent powder charges of the impulse motors and other similar powder charges or elongate pyrotechnic charges, it is now proposed, in accordance with the present invention, to use an extremely fast-burning or detonating fuse arranged along and in direct contact with the charge. By virtue of its high burning or detonating velocity, the extremely fast-burning or detonating fuse provides, when it is fired, an almost instantaneous ignition of the propellent powder charge of the impulse motor along a previously determined stretch which is identical to the length of the primer charge. The ignition of the extremely fast-burning or detonating fuse is effected in a conventional manner and does not in itself involve any problems.

An extremely fast-burning fuse is here understood to mean a fuse with a velocity of propagation in excess of 1,000 m/sec, while a detonating fuse is understood to mean a charge in which the cross-ignition is effected at a velocity which at least corresponds to the sonic speed in the charge in question.

According to one embodiment of the present invention, the special fuse used for cross-ignition of the propellent powder charge is given the form of a tubular, extremely fast-burning low-energy charge of, for example, small amounts of explosive surrounding a powder core. The tubular, extremely fast-burning provides, when initiated, an instantaneous cross-ignition of the powder core, which in turn ensures a 100% cross-ignition of the propellant charge of the impulse motor. That part of this ignition apparatus consisting of an explosive will therefore have a negligible explosive force. Fuses constructed according to this basic concept, with a powder core surrounded by a tubular detonating or extremely fast-burning low-energy charge, are previously known and are available on the market.

We do not therefore make any claims to having discovered the product as such, but, as far as we know, the area of use is entirely new.

A further embodiment of the present invention concerns the positioning of the specific primer fuse. One natural alternative is in a channel formed for this purpose along the center axis of the charge, and this is in itself a conceivable position. However, according to a further embodiment of the invention, the primer fuse is positioned in a separate channel which is arranged parallel to the propellent powder charge and which is in direct contact with the propellent powder charge through one or more openings, for example a longitudinal slot or a number of separate smaller slots or holes arranged in a line. If use is made of the alternative with a single longitudinal slot, it may be expedient to form this slot slightly narrower than the diameter of the primer fuse, by which means it is ensured that the non-initiated primer fuse remains in its correct position, for example during acceleration of the projectile. In addition to this latter effect, the positioning in a separate channel also means that space is saved for a larger propellent powder charge for each impulse motor.

The invention will now be illustrated in greater detail with reference to the attached figures. However, these do not imply any limitation whatsoever, but merely represent one example, while the inventive concept is defined in the subsequent patent claims.

BRIEF DESCRIPTION OF THE DRAWINGS

FIGS. 1 and 2 show embodiments of the present invention in the form of partially cutaway 40-mm AA shells with trajectories which can be corrected;

FIG. 3 shows the cross section along line III—III in FIG. 1;

FIG. 4 is a partial enlarged detail from FIG. 3;

FIG. 5 shows a corresponding partial enlarged detail as in FIG. 4, but viewed along a part of the section V—V in FIG. 2.

FIG. 6 shows a partial enlargement of a cross section of a corresponding shell in which the primer fuse has been arranged directly in a channel made for this purpose around the center axis of the actual charge.

DETAILED DESCRIPTION OF THE PREFERRED EMBODIMENT(S)

The shells 1 and 2 shown in FIGS. 1 and 2 are provided with front actuation parts 3 (not cut away) which can be designed in any chosen manner, for example as ballistic explosive shells provided with proximity fuses. To the rear of the actuation parts 3 and 4 there are positioned central parts 5 and 6 each containing six axially arranged impulse motors 7-12 or 13-18 (only 13 and 16 are shown in FIG. 2). Behind central parts are rear parts 19 and 20 which contain combined receivers and ignition signal initiators 21 and 22 which, while the projectiles are travelling towards the respective target, receive guidance signals from a transmitter on or in the immediate vicinity of the ordnance unit which has fired the shell and converts these guidance signals at the correct time to an ignition signal for the impulse motor or impulse motors to be activated in order to give the respective shell the course correction which the fire-control instrument of the ordnance unit has calculated, taking into consideration the movement of the target, while the shell has been travelling towards the target. The parts 19 and 20 are also provided with extensible fins 23 and sliding shell bourrelets 24. Since the general details regarding trajectory-corrected projectiles are well known, they are not dealt with in greater detail here. It suffices to state that the combined receivers and ignition signal initiators 21 and 22 receive guide impulses via their antennae 25 and 26 which can consist, for example, of laser-sensitive sensors, and the guide impulses are converted to ignition signals for initiation of one or more of the impulse motors 7-12 or 13-18. All of the impulse motors 7-12 or 13-18 are provided with outlet nozzles 27, of which two belonging to impulse motors 7 and 10 and, respectively, 13 and 16 are shown in FIG. 1 and FIG. 2. These outlet nozzles are aligned radially and are placed around the center of gravity of the shell. The firing of an impulse motor thus entails a lateral component of velocity of the shell, and its continued trajectory is determined by the sum of the velocities.

The ignition system characterizing the invention for initiating the propellant powder charge of each impulse motor is shown in from the figures. The propellent powder charges themselves, with the same references as the impulse motors, must be made elongate with a small cross section relative to their length. No other design will really be suitable as long as it is necessary to position the outlet nozzles 27 around the center of gravity of the shell.

For ignition of the respective propellent powder charges, use is made of a corresponding number of lengths of an extremely fast-burning or detonating fuse 28-33 or 34-39 (only 34 and 37 in FIG. 2), which is in each case positioned in a priming channel formed for this purpose and arranged parallel to each propellent powder charge, the priming channel having the same reference number as the respective fuse. The priming channel is in contact with the respective propellent powder charge via openings formed for this purpose, which can either consist of a longitudinal slot 40, as in the design according to FIGS. 1, 3 and 4, or in the form of a number of openings 41 arranged in a row, as in the design according to FIGS. 2 and 5. If the opening has the form of a slot as in FIG. 1 for example, this is preferably made slightly narrower than the respective priming channel and the fuse arranged therein. As shown in FIG. 3, this means that the detonating fuse (reference 31) is held, along part of its circumference, pressed against the outer periphery of the propellent powder charge 10. The fact that the slot 40 is narrower than the extremely fast-burning or detonating fuse eliminates any risk of the fuse being displaced during acceleration of the shell. As further seen from FIG. 4, the fuse in question is designed in the manner characterizing a particular embodiment of the invention, namely with a thin outer jacket 42 of an explosive with an extremely high burning rate, for example hexogen, which surrounds a more slowly-burning powder core 43. A thin outer protective layer 44 may also be included.

In the embodiment shown in FIG. 2, the slot 40 has therefore been replaced by a number of openings 41 arranged in a row. Since the walls between the holes here support the actual fuse and its powder core (which is identical to that in FIG. 4 and whose details therefore bear the same reference numbers), then the holes 41 could very well be made the same width as the outer diameter of the fuse.

FIGS. 1 and 2 show that each fuse extends along the main part of the propellent powder charge of each impulse motor. At their ends directed away from the propellent powder charges, they are connected to their respective initiators 28-33 or 34-39, and which are initiated by the combined receivers and ignition signal initiators 21 and 22 when an impulse motor is to be started for a desired course correction.

When the respective initiator receives an ignition signal, the initiator is initiated, in which respect the fast-burning layer 42 is fired and the ignition impulse is spread virtually instantaneously along the entire length of the fuse. In a normal case this provides an instantaneous cross-ignition of the propellent powder charge along the corresponding part of its length. One requirement is, of course, that the quantity of explosive be so low that no direct explosive force is available. In order to further strengthen the ignition function, in the particular embodiment of the invention shown in FIGS. 4 and 5, the powder core 43 is also available, which provides a sufficient burning time in order to guarantee cross-ignition in all positions.

In the embodiment shown in FIG. 6, the actual initiator or primer fuse 45 is arranged directly in a channel formed for this purpose in the actual main charge 46, which is to be ignited. The various parts of the primer fuse have the reference numbers previously used. The ignition system described above can also be modified for different requirements where an extremely fast cross-ignition of an elongate charge is desirable.

We claim:

1. An ignition device for elongate main propellant powder charges such as gas generators for trajectory-correcting impulse motors, the ignition device comprising:

a fast-burning or detonating fuse positioned along each elongate main propellant powder charge, said fast-burning or detonating fuse being arranged to communicate with at least portions of a surface of the elongate main propellant charge, said fast-burning or detonating fuse including a fast-burning layer surrounding an inner core which contains a slower burning powder, said fast-burning layer being adapted for instantaneous ignition along its entire length, and for providing cross-ignition along a corresponding length of both the propellant charge and the inner core, wherein the slow burning inner core further ensures complete cross-ignition of the main propellant charge.

2. A device according to claim 1, wherein the fast-burning layer of the fuse is surrounded by an outer combustible protective layer which is arranged to communicate with the surface of the main charge.

3. A device according to claim 1, wherein the surface of the main propellant charge is in direct contact with the fast-burning layer of said fuse.

4. A device according to claim 1, wherein said fast-burning layer forms a tube which surrounds said inner core.

5. A device according to claim 4, wherein said fast-burning or detonating fuse is positioned in a separate space delimiting the main propellant powder charge and communicates with the surface of the main charge through at least one opening made in the form of a longitudinal slot.

6. A device according to claim 4, wherein said fast-burning or detonating fuse is positioned in a separate space delimiting the main charge and communicates with the surface of a main charge through a plurality of communicating holes arranged at a slight distance from each other.

7. A device according to claim 4, wherein the fast-burning layer of the fuse is surrounded by an outer combustible protective layer which is arranged to communicate with the surface of the main charge.

8. A device according to claim 4, wherein the fast-burning or detonating fuse is arranged in a groove formed in a casing which surrounds the main charge.

9. A device according to claim 8, wherein said groove opens towards the main charge along a longitudinal slot which has a slightly smaller width than the greatest breadth of the groove, situated at a slight distance therefrom, which in turn corresponds to the greatest breadth of the fuse.

10. A device according to claim 8, wherein the fast-burning or detonating fuse is arranged in a separate channel which is in communication with the main charge through a plurality of openings or holes arranged one after another along said channel.

* * * * *